(12) United States Patent
Tran et al.

(10) Patent No.: US 7,888,924 B2
(45) Date of Patent: Feb. 15, 2011

(54) COMBINATION CONTINUOUS AND DISCONTINUOUS CONTROL OF A POWER REGULATOR

(75) Inventors: Tuan Van Tran, Brighton, CO (US);
John Kevin Rote, Allen, TX (US);
Degang Xia, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 379 days.

(21) Appl. No.: 12/028,354

(22) Filed: Feb. 8, 2008

(65) Prior Publication Data

US 2009/0200995 A1 Aug. 13, 2009

(51) Int. Cl.
*G05F 1/575* (2006.01)
*G05F 1/62* (2006.01)
(52) U.S. Cl. .................. 323/284; 323/283; 323/285
(58) Field of Classification Search ............ 323/282, 323/284, 285, 283
See application file for complete search history.

(56) References Cited

U.S. PATENT DOCUMENTS 7,250,746 B2 * 7/2007 Oswald et al. ............... 323/284
7,471,072 B2 * 12/2008 Fogg et al. .................. 323/284
7,692,417 B2 * 4/2010 Dagher ....................... 323/285

* cited by examiner

*Primary Examiner*—Gary L Laxton
(74) *Attorney, Agent, or Firm*—Dawn V. Stephens; Wade James Brady, III; Frederick J. Telecky, Jr.

(57) ABSTRACT

A power regulator system is described. The system includes a switching system comprising at least one switch and an inductor, the switching system being configured to provide an output voltage based on a current through the inductor. The system also includes a switch driver configured to provide a switching signal to the switching system to control the operation of the at least one switch to provide the current through the at least one inductor. A mode controller is configured to switch the switch driver between a continuous mode of operation and a discontinuous mode of operation based on both a feedback voltage associated with the output voltage and at least one other predetermined operating condition associated with each of the continuous and discontinuous modes of operation.

17 Claims, 3 Drawing Sheets

COMBINATION CONTINUOUS AND DISCONTINUOUS CONTROL OF A POWER REGULATOR

TECHNICAL FIELD

This invention relates to electronic circuits, and more specifically to a combination of continuous and discontinuous control of a power regulator.

BACKGROUND

There is an ever increasing demand for power conversion and regulation circuitry to operate with increased efficiency and reduced power to accommodate the continuous reduction in size of electronic portable devices. Many times these devices are battery powered, and it is desirable to utilize as little power as possible to operate these devices so that the battery life is extended. Switching regulators have been implemented as an efficient mechanism for providing a regulated output in power supplies. One such type of regulator is known as a switching regulator or switching power supply, which controls the flow of power to a load by controlling the on and off duty-cycle of one or more switches coupled to the load. Many different classes of switching regulators exist today.

One type of power regulator is a buck-boost regulator, in which the output voltage is inverted relative to the input voltage. In a typical buck-boost regulator, a switch is used to periodically couple a positive rail voltage to a switching node that is separated from the output voltage by a diode. An inductor is configured to maintain a current flow that is drawn away from the switching node. In an on-state, the inductor current increases, and an output capacitor supplies power to the load. In an off-state, the inductor current decreases as the energy stored in the inductor discharges to provide power to the output capacitor and the load.

A typical power regulator can operate in one of two modes, which can typically depend on the size of the load of the power regulator. One mode is known as a continuous mode of operation. In a continuous mode, the power regulator rapidly switches between the on-state and the off-state (i.e., has a high-frequency duty-cycle), such that the current through the inductor is never fully discharged (i.e., equal to zero). While the continuous mode can be a substantially efficient mode of operation, it can be limited with regard to response time, such as in response to activation, deactivation, and/or load changes.

Another mode is known as a discontinuous mode of operation. In a discontinuous mode, the power regulator may have a substantially longer on-state and off-state. As a result, the current flow through the inductor can be substantially completely discharged at each cycle of the power regulator. The discontinuous mode therefore provides a greater response time with regard to the current through the inductor. However, operating in the discontinuous mode can be significantly less efficient, as the peak current through the inductor can be significantly greater than operation in the continuous mode.

SUMMARY

One embodiment of the invention includes a power regulator system. The system comprises a switching system comprising at least one switch and an inductor, the switching system being configured to provide an output voltage based on a current through the inductor. The system also comprises a switch driver configured to provide a switching signal to the switching system to control the operation of the at least one switch to provide the current through the at least one inductor. The system further comprises a mode controller configured to switch the switch driver between a continuous mode of operation and a discontinuous mode of operation based on both a feedback voltage associated with the output voltage and at least one other predetermined operating condition associated with each of the continuous and discontinuous modes of operation.

Another embodiment of the invention includes a method of generating an output voltage from a power regulator system. The method comprises operating in a continuous mode of operation to control at least one switch over a plurality of cycles to provide a current through an inductor. The output voltage can be associated with the current through the inductor. The method also comprises operating in a discontinuous mode of operation to control the at least one switch to provide the current through the inductor. The method further comprises switching between the continuous mode of operation and the discontinuous mode of operation based on the output voltage and based on at least one predetermined condition associated with a predetermined duration of time in a respective one of the continuous mode of operation and the discontinuous mode of operation.

Another embodiment of the invention includes a power regulator system. The system comprises means for generating an output voltage based on a current through an inductor in response to a switching signal and means for controlling the switching signal in a continuous mode of operation to maintain the current through the inductor. The method also comprises means for controlling the switching signal in a discontinuous mode of operation to discharge the current through the inductor. The method further comprises means for switching between the continuous mode of operation and the discontinuous mode of operation based on at least one of a feedback voltage corresponding to the output voltage relative to at least one threshold and at least one predetermined operating condition associated with each of the respective continuous and discontinuous modes of operation.

DETAILED DESCRIPTION

The invention relates to electronic circuits, and more specifically to a combination of continuous and discontinuous control of a power regulator. The power regulator, which can be configured as a buck-boost regulator, can include a switching system that includes at least one switch and an inductor, such that an output voltage can be based on the current flow through the inductor. The at least one switch can be controlled by a switching system to switch between an on-state and an off-state to couple the inductor to a voltage to generate the output voltage. The power regulator can include a mode controller that can switch between a continuous mode of operation and a discontinuous mode of operation for the switching system. The switching between the continuous and discontinuous modes can be based on a feedback voltage that is associated with the output voltage, and/or can it can be based on a predetermined condition associated with each of the modes. For instance, such predetermined condition can correspond to a predetermined duration of time in a given mode.

By way of example, in the continuous mode, the mode controller can provide a programmable number of pulses to a switch driver for operation of the switching system in the on and off-states. The pulses can have a duty-cycle that is fixed or it can be programmable. Upon the last of the programmable number of pulses, or upon the feedback voltage being greater than a predetermined high voltage threshold, the mode controller can switch to the discontinuous mode. In the discontinuous mode, the mode controller can command the switch driver to control the switch to discharge the inductor substantially completely. Upon discharge of the inductor, or upon startup of the power regulator, the mode controller can provide a longer pulse of a programmable length of time to the switch driver. As a result, the inductor can continuously build the current flow to rapidly increase the output voltage. Accordingly, based on switching between the continuous and discontinuous modes as described herein, the power regulator can operate with a greater response speed than the continuous mode, and with substantially greater efficiency than discontinuous mode.

Figure 1:
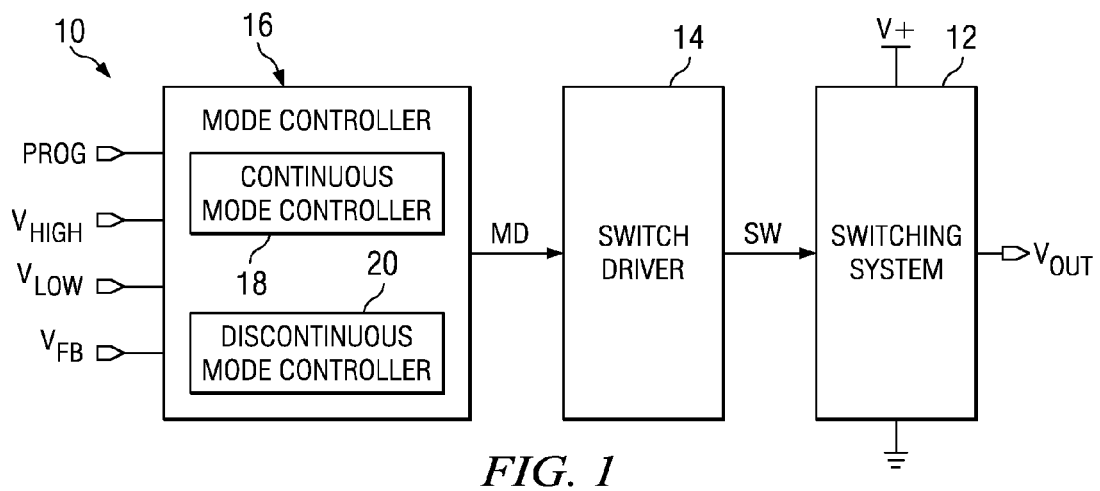
FIG. 1 illustrates an example of a power regulator system in accordance with an aspect of the invention.

FIG. 1 illustrates an example of a power regulator system 10 in accordance with an aspect of the invention. The power regulator system 10 can be configured in any of a variety of applications to provide an output voltage $V_{OUT}$. As an example, the power regulator system 10 can be implemented in a portable electronic device, such as a laptop computer or a wireless communication device. The power regulator system 10 can be configured as any of a variety of types of power regulators, such as a buck-boost regulator.

The power regulator system 10 includes a switching system 12. The switching system 12 can include at least one switch and an inductor. As an example, the at least one switch can be activated in an on-state and deactivated in an off-state to periodically couple a positive rail voltage V+ to the inductor. As a result, the inductor can conduct a current flow, such that the output voltage $V_{OUT}$ varies depending on the current flow through the inductor. For example, the inductor can provide the current flow to an output capacitor and to the load during the off-time, such that the output capacitor is charged and the output voltage $V_{OUT}$ is provided by the decreasing current flow through the inductor during the off-time. During the on-time, the current flow through the inductor can be increased and can concurrently charge the output capacitor. Accordingly, the output voltage $V_{OUT}$ can be regulated based on the relative on-time and off-time of the switching system 12.

In the example of FIG. 1, the power regulator system 10 includes a switch driver 14. The switch driver 14 provides a switching signal SW to the switching system 12. The switching signal SW can be asserted (i.e., logic 1) to begin the on-state for the switching system 12, such as to couple the inductor to the positive rail voltage V+. As used herein, a sequential on-state and an off-state defines a cycle or period for the switching system 12 in the continuous mode of operation. Similarly, the switching signal SW can be de-asserted (i.e., logic 0) to begin the off-state for the switching system 12, such as to decouple the inductor to the positive rail voltage V+. The switch driver 14 can be configured, for example, as a buffer and/or logic converter for control of the one or more switches in the switching system 12.

The power regulator system 10 also includes a mode controller 16. The mode controller 16 can be configured, for example, as a state machine that is configured to provide a mode signal MD to the switch driver 14. As an example, the mode signal MD can be a digital signal that is asserted in the on-state and de-asserted in the off-state, such that the switch driver 14 can buffer and or provide logic operations on the mode signal MD to control the one or more switches of the switching system 12. The mode controller 16 includes a continuous mode controller 18 and a discontinuous mode controller 20, which controllers can be implemented as corresponding states of a state machine. Therefore, the mode controller 16 can be configured to switch between a continuous mode and a discontinuous mode, such that the continuous mode controller 18 sets the operation of the mode signal MD during the continuous mode and the discontinuous mode controller 20 sets the operation of the mode signal MD during the discontinuous mode.

As an example, the continuous mode controller 18 can include a pulse generator. Thus, the continuous mode controller 18 can generate a predetermined number of pulses that correspond to the on-state and the off-state of the mode signal MD, and thus the switching system 12. For example, the predetermined number of pulses can have a predefined duty-cycle, such that a high-pulse corresponds to the on-state and a low-pulse corresponds to the off-state. As another example, the discontinuous mode controller 20 can include a pulse-timer. For example, the pulse timer can be configured to set a low-pulse having a predetermined time that depends on the inductance of the inductor, such that the current through the inductor can be discharged substantially completely during the discontinuous mode. The pulse timer can also be configured to set a high pulse of a predetermined length of time, such that, upon a magnitude of the inductor current being approximately equal to zero, the high pulse can activate an on-time of the predetermined length to rapidly recharge the current through the inductor.

In the example of FIG. 1, the mode controller 16 receives a programming signal PROG that can include programmable information regarding the mode controller 16. For example, the programming signal PROG can include information for programming the number of pulses and/or the duty-cycle of the pulse generator of the continuous mode controller 18, and/or can include information for programming the length of time of the pulse timer of the discontinuous mode controller 20.

The mode controller 16 receives a feedback voltage $V_{FB}$ that can correspond to the output voltage $V_{OUT}$. As an example, the feedback voltage $V_{FB}$ can be approximately equal to the output voltage $V_{OUT}$, or can be a scaled version of the output voltage $V_{OUT}$, such as a voltage-divided version of the output voltage $V_{OUT}$. As a result, the feedback voltage $V_{FB}$ can be directly proportional to the output voltage $V_{OUT}$. The mode controller 16 can be configured to compare the feedback voltage $V_{FB}$ with a predetermined high voltage threshold $V_{HIGH}$ and a predetermined low voltage threshold $V_{LOW}$. As an example, the predetermined high voltage threshold $V_{HIGH}$ and the predetermined low voltage threshold $V_{LOW}$ can be programmable in run-time, such as in response to changing load conditions of the power regulator system 10. Therefore, the mode controller 16 can be configured to switch between the continuous mode and the discontinuous mode based on the magnitude of the feedback voltage $V_{FB}$. As an example, the mode controller 16 can switch from the discontinuous mode to the continuous mode in response to the magnitude of the feedback voltage $V_{FB}$ being less than the predetermined low voltage threshold $V_{LOW}$. As another example, the mode controller 16 can switch from the continuous mode to the discontinuous mode in response to the magnitude of the feedback voltage $V_{FB}$ being greater than the predetermined high voltage threshold $V_{HIGH}$. As a result, the output voltage $V_{OUT}$ can be regulated to a magnitude that resides between two extreme threshold values.

The mode controller 16 can also be configured to switch between the continuous mode and the discontinuous mode based on one or more predetermined conditions associated with the respective modes of operation. As an example, in the continuous mode of operation, the mode controller 16 can be configured to automatically switch to the discontinuous mode of operation upon completion of the predetermined number of pulses corresponding to the on and off-states of the switching system 12. As another example, in the discontinuous mode of operation, the mode controller 16 can be configured to switch to the continuous mode at the expiration of the predetermined length of the pulse timer. The mode controller 16 can also be configured to set a priority for transition. As an example, the comparison of the feedback voltage $V_{FB}$ with the predetermined high and low voltage thresholds $V_{HIGH}$ and $V_{LOW}$ can have priority of the transition over the one or more predetermined conditions.

It is to be understood that the power regulator system 10 is not intended to be limited to the example of FIG. 1. For example, the mode signal MD can be generated as a buffered signal, and the switching system 12 can be configured with a single switch device. As such, the switch driver 14 may not be necessary in the example of FIG. 1. Accordingly, the power regulator system 10 can be configured in any of a variety of ways.

Figure 2:
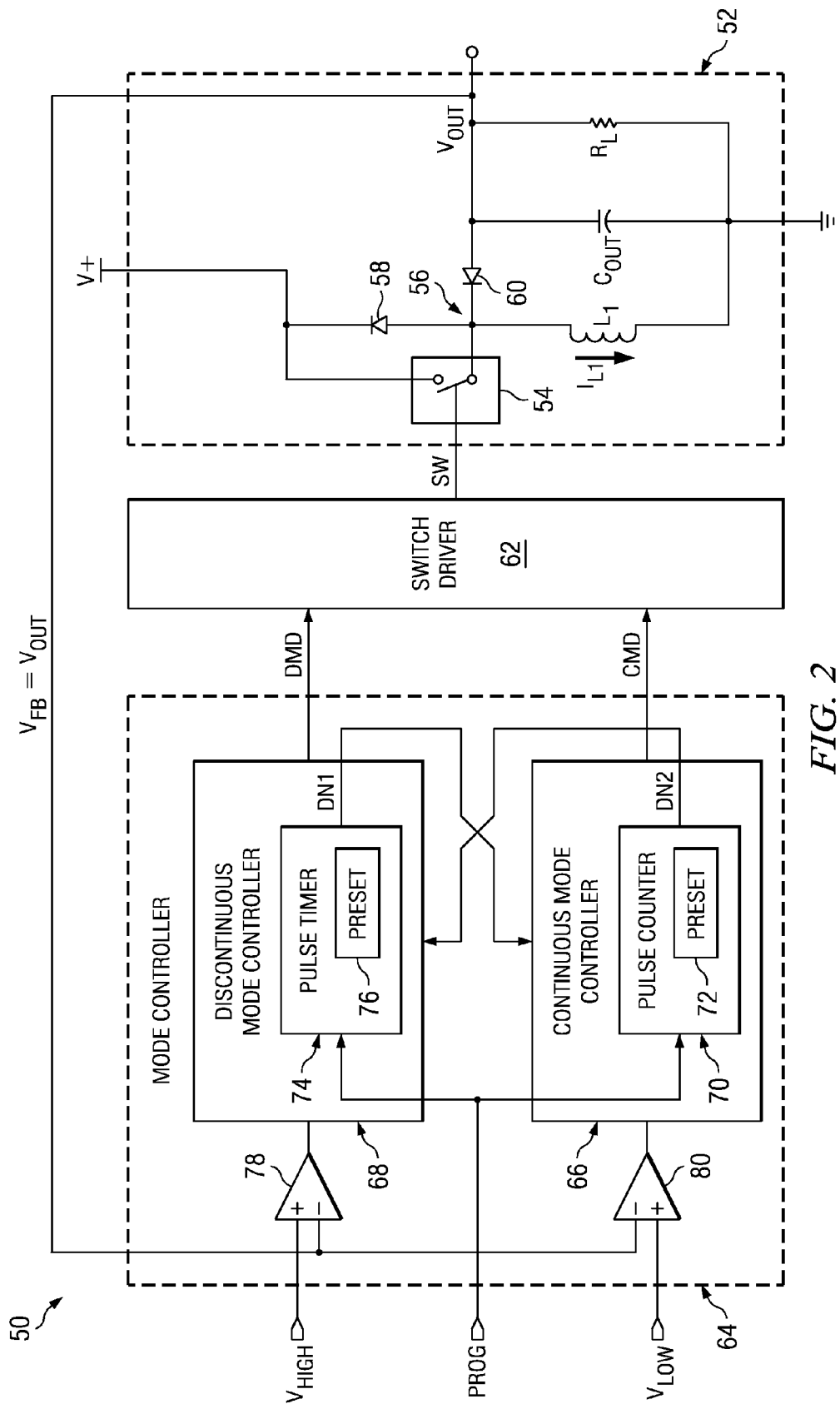
FIG. 2 illustrates another example of a power regulator system in accordance with an aspect of the invention.

FIG. 2 illustrates another example of a power regulator system 50 in accordance with an aspect of the invention. The power regulator system 50 can be configured in any of a variety of applications to provide an output voltage $V_{OUT}$. As an example, the power regulator system 10 can be implemented in a portable electronic device, such as a laptop computer or a wireless communication device.

The power regulator system 50 includes a switching system 52. The switching system 52 includes a switch 54 that interconnects a positive rail voltage V+ and a node 56. As an example, the switch 54 can be configured as a transistor, such as a P-type field effect transistor (FET). The node 56 is also separated from the positive rail voltage V+ by a diode 58 having an anode coupled to the node 56 and a cathode at the positive rail voltage V+. In addition, the node 56 is connected to low voltage rail (demonstrated as ground in the example of FIG. 2) through an inductor L1. The inductor $L_1$ is configured to conduct a current with which the output voltage $V_{OUT}$ is associated. In addition, the node 56 is separated from the output voltage $V_{OUT}$ by a diode 60 that is arranged with an anode at the output voltage $V_{OUT}$ and a cathode at the node 56. The output voltage $V_{OUT}$ is separated from ground by an output capacitor $C_{OUT}$ and a load resistor $R_L$.

As demonstrated in the example of FIG. 2, the switching system 52 is configured as a buck-boost converter. Specifically, the switch 54 can be activated based on a switching signal SW, such that, upon the switching signal SW being asserted during an on-time, the switch 54 couples the positive rail voltage V+ to the inductor $L_1$ to begin the flow of a current $I_{L1}$ through the inductor $L_1$. The current $I_{L1}$ also charges the output capacitor $C_{OUT}$ and provides a negative potential of the output voltage $V_{OUT}$ during the on-time. Upon the switching signal SW being de-asserted during an off-time, the switch 54 decouples the inductor $L_1$ from the positive rail voltage V+ to discharge the current $I_{L1}$ through the inductor $L_1$. The output capacitor $C_{OUT}$ is thus discharged to the output voltage $V_{OUT}$ to increase the output voltage $V_{OUT}$ (i.e., set less negative). Accordingly, the output voltage $V_{OUT}$ can be regulated based on the relative on-time and off-time.

In the example of FIG. 2, the power regulator system 50 includes a switch driver 62. The switch driver 62 provides a switching signal SW to the switching system 52. As described above, the switching signal SW can be asserted during the on-state of the switching system 52, and can be de-asserted for the off-state of the switching system 12. The switch driver 62 can thus be configured, for example, as a buffer and/or logic converter for control of the switch 54.

The power regulator system 50 also includes a mode controller 64. The mode controller 64 includes a continuous mode controller 66 and a discontinuous mode controller 68. Thus, the mode controller 64 can be configured to operate the switching system 52 in one of the continuous mode and the discontinuous mode of operation, and can also be configured to switch between the two modes.

The continuous mode controller 66 is configured to generate a signal CMD that is provided to the switch driver 62. The signal CMD can be a digital signal corresponding to the on-state and the off-state for activation of the switch 54 during a continuous mode of operation. The continuous mode controller 66 includes a pulse counter 70 that is configured to generate a predetermined number of pulses that correspond to the on-state and the off-state of the signal CMD, and thus the switching system 52. The predetermined number of pulses can be provided via a programming signal PROG, and can be stored in a memory 72 of the pulse counter 70. The programming signal PROG can also be configured to set the duty-cycle of the pulses, such that the length of time of a high pulse and the length of time of a low pulse can be defined by the programming signal PROG. The programming signal PROG can also be configured to change the number of pulses in the preset memory 72 or redefine the duty-cycle of the pulses during run-time of the power regulator system 50. Accordingly, based on the continuous mode operation of the power regulator system 50, the output voltage $V_{OUT}$ can be provided at a substantially reduced peak magnitude of the inductor current $I_{L1}$.

The discontinuous mode controller 68 is configured to generate a signal DMD that is provided to the switch driver 62. Similar to the signal CMD, the signal DMD can be a digital signal corresponding to the on-state and the off-state for activation of the switch 54 during a discontinuous mode of operation. The discontinuous mode controller 68 includes a pulse timer 74 that is configured to consecutively generate a low pulse and a high pulse of a predetermined amount of time. For example, upon the mode controller 64 switching to the discontinuous mode, the discontinuous mode controller 68 can be configured to generate a low pulse to deactivate the switch 54 for a predetermined amount of time stored in a preset memory 76 of the pulse timer 74. As a result, the current $I_{L1}$ through the inductor $L_1$ can be discharged substantially completely. As an example, the predetermined amount of time can be based on an inductance of the inductor $L_1$ or can be programmable to the preset memory 76 via the programming signal PROG. As another example, the current $I_{L1}$ through the inductor $L_1$ can be measured to determine if it has been fully discharged to a magnitude of zero.

Upon expiration of the predetermined length of time of the low pulse, or upon initialization of the power regulator system 50, the discontinuous mode controller 68 can be configured to generate a high pulse of a predetermined length of time, which can be different from the predetermined length of the low pulse. The high pulse can thus set the switch to activate in an on-time for the entirety of the predetermined length of time, such as to rapidly build the current $I_{L1}$ through the inductor $L_1$. The length of time of the high pulse can likewise be programmable to the preset memory 76 based on the programming signal PROG, and can further be programmed during a run-time of the power regulator system 50. Accordingly, based on the discontinuous mode operation of the power regulator system 50, the output voltage $V_{OUT}$ can be provided having a high response time.

As described above, the mode controller 64 is configured to switch between the continuous mode of operation and the discontinuous mode of operation. Specifically, the mode controller 64 can switch between the continuous and discontinuous modes of operation based on one or more predetermined conditions associated with the respective current mode of operation, or can switch between the modes based on monitoring a feedback voltage, demonstrated as the output voltage $V_{OUT}$ in the example of FIG. 2. Upon expiration of the predetermined length of time of the high pulse that causes the current $I_{L1}$ to increase through the inductor $L_1$, the pulse timer 74 can provide a done signal DN1 to the continuous mode controller 66. In response to the done signal DN1, the mode controller 64 can switch from the discontinuous mode to the continuous mode. Conversely, upon the providing the last of the predetermined number of pulses of the predefined duty-cycle, the pulse counter 70 can provide a done signal DN2 to the discontinuous mode controller 68. In response to the done signal DN2, the mode controller 64 can switch from the continuous mode to the discontinuous mode. The respective done signals DN1 and DN2 thus cause respective changes in the state machine that controls the mode of operation for the switching regulator 50.

In addition, the mode controller 64 includes a comparator 78 and a comparator 80. The comparator 78 is configured to compare the output voltage $V_{OUT}$ with a predetermined high voltage threshold $V_{HIGH}$. Upon the output voltage $V_{OUT}$ exceeding the predetermined high voltage threshold $V_{HIGH}$, the comparator 78 can provide an activation signal to the discontinuous mode controller 68. Therefore, the mode controller 64 can switch from the continuous mode to the discontinuous mode in response to the output voltage $V_{OUT}$ becoming too large. Similarly, the comparator 80 is configured to compare the output voltage $V_{OUT}$ with a predetermined low voltage threshold $V_{LOW}$. Upon the output voltage $V_{OUT}$ becoming less than the predetermined low voltage threshold $V_{LOW}$, the comparator 80 can provide an activation signal to the continuous mode controller 66. Therefore, the mode controller 64 can switch from the discontinuous mode to the continuous mode in response to the output voltage $V_{OUT}$ becoming too low. It is to be understood that the switching between the continuous and discontinuous modes based on the magnitude of the output voltage $V_{OUT}$ can be prioritized above the predetermined conditions of the continuous mode controller 66 and the discontinuous mode controller 68. It will be further understood and appreciated that while a pair of comparators 78 and 80 are depicted in the example of FIG. 2, that a single comparator having hysteresis may be utilized, with the normal high voltage providing $V_{HIGH}$ and the normal low voltage level providing $V_{LOW}$.

As described above, based on the continuous mode operation of the power regulator system 50, the output voltage $V_{OUT}$ can be provided at a substantially reduced peak magnitude of the inductor current $I_{L1}$. Similarly, based on the discontinuous mode operation of the power regulator system 50, the output voltage $V_{OUT}$ can be provided having a high response time. The mode controller 64 can therefore provide the benefit of both continuous mode of operation and discontinuous mode of operation of the switching system 52. Furthermore, based on the information that can be provided to the mode controller 64 via the programming signal PROG, the operation of the switching system 52 can be optimized for efficiency and response time. Additionally, in circumstances when low power may be needed, the regulator system 50 can run in a burst mode corresponding to the discontinuous mode of operation.

It is to be understood that the power regulator system 50 is not intended to be limited to the example of FIG. 2. For example, the power regulator system 50 is not intended to be limited to the use of a buck-boost converter, but that the switching system 52 can be configured as a buck or boost converter instead. As another example, the mode controller 64 can include additional input signals that can provide additional conditions for switching between the continuous mode and the discontinuous mode. As yet another example, the signals CMD and DMD can be consolidated, such that the mode controller 64 provides a single mode signal that is based on the current mode of operation. Accordingly, the power regulator system 50 can be configured in any of a variety of ways.

Figure 3:
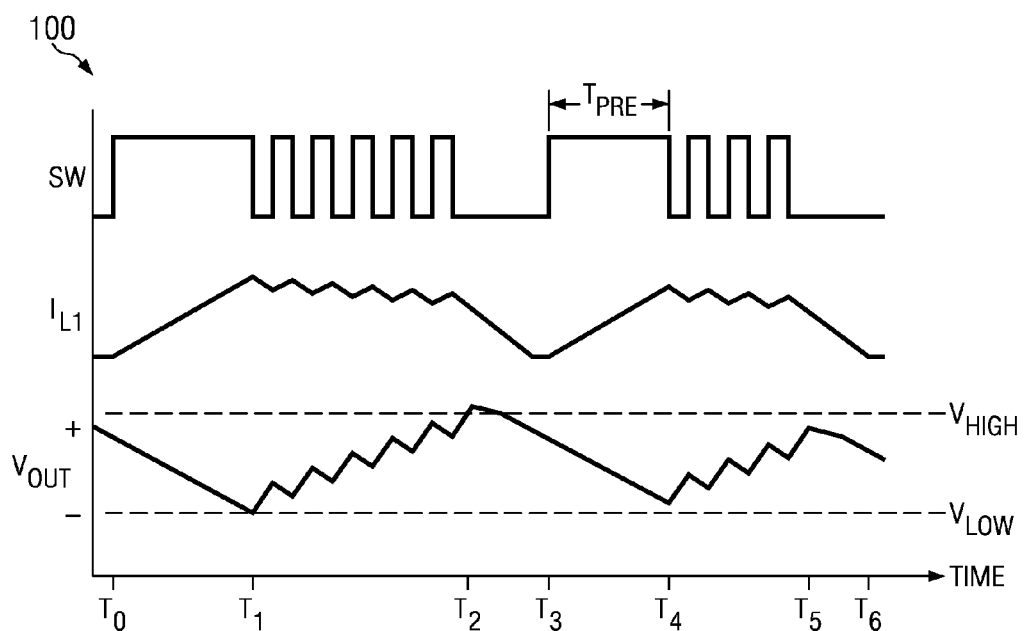
FIG. 3 illustrates an example of a timing diagram in accordance with an aspect of the invention.

FIG. 3 illustrates an example of a timing diagram 100 in accordance with an aspect of the invention. The timing diagram 100 can correspond to the power regulator system 50 in the example of FIG. 2. As such, reference is to be made to the example of FIG. 2 in the following discussion of the example of FIG. 3.

The timing diagram 100 demonstrates the switching signal SW provided from the switch driver 62 to the switch 54, the current $I_{L1}$ through the inductor $L_1$, and the output voltage $V_{OUT}$ plotting against time. At a time $T_0$, the switching signal SW is asserted, thus beginning an on-time and activating the switch 54. At this time, the mode controller 64 can be operating in the discontinuous mode, thus providing a long pulse of a predetermined amount of time to build the current $I_{L1}$ in the inductor $L_1$. Therefore, as demonstrated in the example of FIG. 3, at the time $T_0$, the inductor current $I_{L1}$ begins to increase. In response, the output voltage $V_{OUT}$ begins to decrease. It is to be understood that, based on the configuration of the switching system 52 as a buck-boost converter, the output voltage can be negative, such that the decrease of the output voltage $V_{OUT}$ is actually a decrease of the absolute value of the output voltage $V_{OUT}$ to set the output voltage $V_{OUT}$ as less negative.

At a time $T_1$, the output voltage $V_{OUT}$ achieves a magnitude that is less than a predetermined low voltage threshold $V_{LOW}$. As a result, the mode controller 64 switches to a continuous mode of operation based on the output of the comparator 80. It is to be understood that the predetermined length of time of the long pulse may not have expired, but that output voltage $V_{OUT}$ becoming less than the predetermined low voltage threshold $V_{LOW}$ can have priority for switching the mode. As a result, the continuous mode controller 66 begins provided the signal CMD as pulses. This is demonstrated in the example of FIG. 3 as the switching signal SW being provided as a pulsed signal having a predefined duty-cycle. In the example of FIG. 3, the duty-cycle is demonstrated as fifty percent, such that the on-time is substantially equal to the off-time. However, it is to be understood that the duty-cycle can be programmed to any amount based on the programming signal PROG. In response to the continuous mode, at each on-time pulse of the switching signal, the inductor current $I_{L1}$ decreases and the output voltage $V_{OUT}$ increases based on the discharge of the capacitor. Likewise, at each off-time pulse of the switching signal, the inductor current $I_{L1}$ increases and the output voltage $V_{OUT}$ decreases based on the charging of the current $I_{L1}$ through the inductor $L_1$.

At a time $T_2$, the output voltage $V_{OUT}$ achieves a magnitude that is greater than a predetermined high voltage threshold $V_{HIGH}$. As a result, the mode controller 64 switches to a discontinuous mode of operation based on the output of the comparator 78. It is to be understood that the continuous mode controller 66 may not have generated the last of the predetermined number of pulses, but that output voltage $V_{OUT}$ becoming greater than the predetermined high voltage threshold $V_{HIGH}$ can have priority for switching the mode. As a result, the discontinuous mode controller 68 may generate a low pulse of the signal DMD, and thus the switching signal SW, to deactivate the switch 54. As a result, the current $I_{L1}$ through the inductor $L_1$ may be substantially completely discharged. Upon the current $I_{L1}$ becoming approximately zero, such as based on a predetermined length of time of the low pulse, the discontinuous mode controller 68 generates another high pulse of a predetermined length beginning at a time $T_3$.

For the high pulse beginning at the time $T_3$, it is to be assumed that the predetermined length of time for the high pulse has been changed prior to the time $T_3$ via the programming signal PROG. Specifically, the predetermined length of time has been reduced to a length of time $T_{PRE}$. Likewise, it is to be assumed that the predetermined number of pulses in the preset memory 72 of the pulse counter 70 has changed to three. Therefore, at a time $T_4$, the length of time $T_{PRE}$ has expired, and thus the pulse timer 74 generates the done signal DN1 to the continuous mode controller 66 to switch from the discontinuous mode to the continuous mode.

Beginning at the time $T_4$, the continuous mode controller 66 provides the three pulses of the switching signal SW, as dictated by the preset memory 72 of the pulse counter 70. Upon the last of the three pulses being provided, demonstrated at a time $T_5$, the pulse counter 70 provides the done signal DN2 to the discontinuous mode controller 68. As a result, the mode controller 64 switches from the continuous mode to the discontinuous mode. Therefore, the discontinuous mode controller 68 once again generates a low pulse to discharge the current $I_{L1}$ until the current $I_{L1}$ reaches a magnitude of approximately zero, as demonstrated in the example of FIG. 3 at a time $T_6$. According, the mode controller 64 can continue operating by alternating between the continuous and the discontinuous modes to regulate the magnitude of the output voltage $V_{OUT}$.

Figure 4:
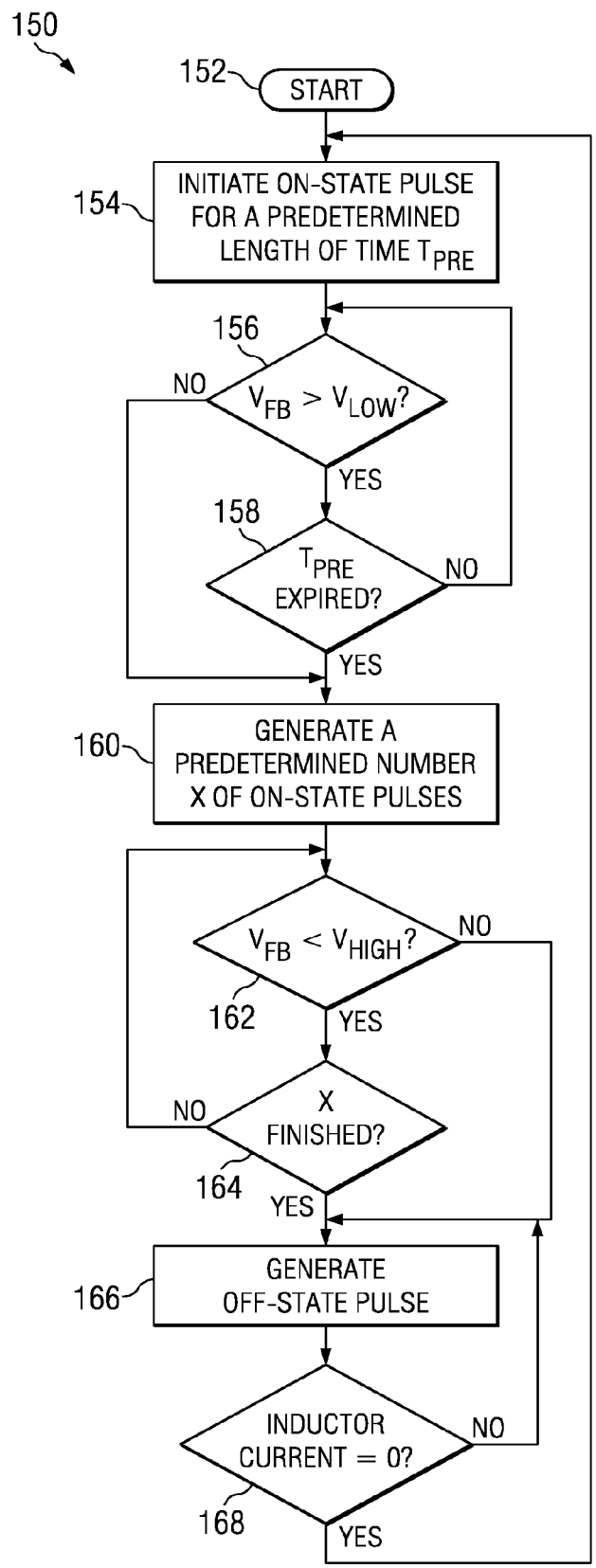
FIG. 4 illustrates an example of a method for providing an output voltage of a power regulator in accordance with an aspect of the invention.

In view of the foregoing structural and functional features described above, certain methods will be better appreciated with reference to FIG. 4. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., analog or digital circuitry, such as may be embodied in an application specific integrated circuit), software (e.g., as executable instructions stored in memory or running on a processor implemented in an ASIC), or any combination of hardware and software.

FIG. 4 illustrates an example of a method 150 for providing an output voltage of a power regulator in accordance with an aspect of the invention. The method begins at 152. The power regulator can begin in a discontinuous mode of operation, such that the current through an inductor of the power regulator is approximately zero. At 154, an on-state pulse is initiated for predetermined length of time $T_{PRE}$. The on-state pulse can correspond to the activation of a switch to couple a positive rail voltage to the inductor of the power regulator. At 156, a feedback voltage $V_{FB}$ is compared with a predetermined low voltage threshold $V_{LOW}$. The feedback voltage $V_{FB}$ can correspond to the output voltage of the power regulator. If the feedback voltage $V_{FB}$ is greater than the predetermined low voltage threshold $V_{LOW}$, the method proceeds to 158. If the feedback voltage $V_{FB}$ is not greater than the predetermined low voltage threshold $V_{LOW}$, the method proceeds to 160. At 158, the method determines if the predetermined time $T_{PRE}$ has expired. If the predetermined time $T_{PRE}$ has not expired, the method returns to 156. If the predetermined time $T_{PRE}$ has expired, the method proceeds to 160.

At 160, a predetermined number X of on-state pulses are generated. Thus, the power regulator has been switched from the discontinuous mode to a continuous mode of operation, such that the current through the inductor does not reach zero at each on-state and off-state cycle. The predetermined on-state pulses can have a predefined duty-cycle that can be programmable. The number X of pulses can also be programmable. At 162, the feedback voltage $V_{FB}$ is compared with a predetermined high voltage threshold $V_{HIGH}$. If the feedback voltage $V_{FB}$ is less than the predetermined high voltage threshold $V_{HIGH}$, the method proceeds to 164. If the feedback voltage $V_{FB}$ is not less than the predetermined high voltage threshold $V_{HIGH}$, the method proceeds to 166. At 164, the method determines if the number X of pulses have finished. If the number X of pulses have not finished, the method returns to 162. If the number X of pulses have finished, the method proceeds to 166.

At 166, an off-state pulse is generated. The power regulator has thus been switched from the continuous mode to the discontinuous mode of operation. At 168, the method determines if the inductor current has a magnitude that is approximately zero. If the inductor current is greater than approximately zero, the method returns to 166. Thus, the off-state pulse can have a predetermined length of time that is sufficient to discharge the current through the inductor. As another example, the current through the inductor can be measured to determine if it has a magnitude that is approximately zero. If the inductor current is approximately zero, the method returns to 154, thus beginning the method again with the initiation of the on-state pulse to generate current through the inductor. Therefore, the method 150 in the example of FIG. 4 demonstrates the sequential switching of the power regulator between a continuous mode of operation and a discontinuous mode of operation. As a result, the advantages of both modes of operation can be realized. Specifically, the power regulator can be more efficient based on the continuous mode of operation, but can have a more rapid response, such as to load changes, based on the discontinuous mode of operation.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power regulator system comprising:
   a switching system comprising at least one switch and an inductor, the switching system being configured to provide an output voltage based on a current through the inductor;
   a switch driver configured to provide a switching signal to the switching system to control the at least one switch to provide the current through the at least one inductor; and a mode controller configured to switch the switch driver between a continuous mode of operation and a discontinuous mode of operation based on the output voltage and based on at least one other predetermined operating condition of each of the continuous mode of operation and the discontinuous mode of operation, wherein, during the continuous mode, the switch driver is configured to generate a predetermined number of pulses having a predefined duty-cycle to control the at least one switch, the predetermined number of pulses defining a corresponding length of time of operation in the continuous mode of operation.

2. The system of claim 1, wherein the mode controller is configured to switch from the continuous mode to the discontinuous mode in response to a feedback voltage, corresponding to the output voltage, exceeding a predetermined high voltage threshold and to switch from the discontinuous mode to the continuous mode in response to the feedback voltage being less than a predetermined low voltage threshold.

3. The system of claim 1, wherein the predetermined number of pulses and the predefined duty-cycle are each programmable to define the at least one other predetermined operating condition, the mode controller switching the switch driver from the continuous mode to the discontinuous mode in response to completion of the predetermined number of pulses.

4. The system of claim 1, wherein the mode controller comprises a pulse counter, and wherein the at least one predetermined operating condition associated with the continuous mode of operation comprises completion of the predetermined number of pulses based on a number of pulses counted by the pulse counter.

5. The system of claim 1, wherein, during the discontinuous mode, the switch driver is configured to control the at least one switch to discharge the current through the inductor substantially completely.

6. A power regulator system comprising:
a switching system comprising at least one switch and an inductor the switching system being configured to provide an output voltage based on a current through the inductor;
a switch driver configured to provide a switching signal to the switching system to control the at least one switch to provide the current through the at least one inductor; and
a mode controller configured to switch the switch driver between a continuous mode of operation and a discontinuous mode of operation based on the output voltage and based on at least one other predetermined operating condition of each of the continuous mode of operation and the discontinuous mode of operation,
the switch driver is configured to generate a pulse having a predetermined length of time in response to the discharge of the current through the inductor to control the at least one switch to begin providing the current through the inductor.

7. The system of claim 6, wherein the predetermined length of time is programmable.

8. The system of claim 6, wherein the mode controller comprises a pulse timer, the at least one predetermined operating condition associated with the discontinuous mode of operation comprises expiration of the predetermined length of time based on the pulse timer, such that the mode controller switches the switch driver from the discontinuous mode to the continuous mode in response to the expiration of the predetermined length of time.

9. A method of generating an output voltage from a power regulator system, the method comprises:
operating in a continuous mode of operation to control at least one switch over a plurality of cycles to provide a current through an inductor, the output voltage depending on the current through the inductor;
operating in a discontinuous mode of operation to control the at least one switch to provide the current through the inductor; and
switching between the continuous mode of operation and the discontinuous mode of operation based on at least one predetermined condition associated with a predetermined duration of time in a respective one of the continuous mode of operation and the discontinuous mode of operation,
wherein operating in the continuous mode of operation further comprises generating a predetermined number of pulses having a predefined duty-cycle to control the at least one switch during the continuous mode of operation, the predetermined number of pulses defining the predetermined duration of time in the continuous mode of operation.

10. The method of claim 9, further comprising programming the predetermined number of pulses and the predefined duty-cycle to control the predetermined duration of time in the continuous mode during run-time of the power regulator system.

11. The method of claim 9, wherein operating in the discontinuous mode of operation comprises deactivating the at least one switch to discharge the current through the inductor substantially completely.

12. The method of claim 9, further comprising monitoring a feedback voltage corresponding to the output voltage; wherein switching between the continuous mode of operation and the discontinuous mode of operation further comprises switching from the continuous mode of operation to the discontinuous mode of operation in response to the feedback voltage exceeding a predetermined high voltage threshold.

13. The method of claim 9, further comprising monitoring a feedback voltage associated with the output voltage; wherein switching between the continuous mode of operation and the discontinuous mode of operation further comprises switching from the discontinuous mode of operation to the continuous mode of operation in response to the feedback voltage being less than a predetermined low voltage threshold.

14. The method of claim 9, wherein switching between the continuous mode of operation and the discontinuous mode of operation further comprises:
switching from the continuous mode of operation to the discontinuous mode of operation in response to one of (i) expiration of the predetermined duration of time corresponding to completion of a predetermined number of the plurality of cycles having a predefined duty-cycle and (ii) a feedback voltage, corresponding to the output voltage, exceeding a predetermined high voltage threshold; and
switching from the discontinuous mode of operation to the continuous mode of operation in response to the expiration of the predetermined duration of time.

15. A power regulator system comprising:
means for generating an output voltage based on a current through an inductor in response to a switching signal;
means for controlling the switching signal in a continuous mode of operation to maintain the current through the inductor;

means for controlling the switching signal in a discontinuous mode of operation to discharge the current through the inductor; and means for switching between the continuous mode of operation and the discontinuous mode of operation based on at least one of a feedback voltage corresponding to the output voltage relative to at least one threshold and at least one predetermined operating condition associated with a predetermined duration of time in each of the respective continuous mode of operation and the discontinuous mode of operation, wherein the means for switching comprises means for comparing the feedback voltage with a predetermined high voltage threshold and a predetermined low voltage threshold, the means for switching being configured to switch to the continuous mode of operation in response to the feedback voltage being less than the predetermined low voltage threshold and to switch from the continuous mode of operation to the discontinuous mode of operation in response to the feedback voltage being greater than the predetermined high voltage threshold.

16. The system of claim 15, wherein the at least one predetermined condition associated with the continuous mode comprises completion of a predetermined number of pulses being provided to the means for generating the output voltage, the means for switching switches the means for controlling the switching signal from the continuous mode of operation to the discontinuous mode of operation in response to the completion of the predetermined number of pulses; and the at least one predetermined condition associated with the discontinuous mode comprising at least one of discharging the current through the inductor substantially completely and expiration of a predetermined length of time during which a pulse is provided to the means for generating the output voltage, the means for switching switches the means for controlling the switching signal from the discontinuous mode of operation to the continuous mode of operation in response to the expiration of the predetermined length of time.

17. The system of claim 15, wherein the means for controlling the switching signal in the continuous mode of operation comprises means for generating a programmable number of pulses to the means for generating the output voltage during the continuous mode of operation, the means for switching switches the means for controlling the switching signal from the continuous mode to the discontinuous mode in response to completion of the programmable number of pulses, and wherein the means for controlling the switching signal in the discontinuous mode of operation further comprises:

means for discharging the current through the inductor substantially completely; and means for providing a pulse having a programmable length of time to the means for generating the output voltage.

* * * * *